United States Patent
Nurminen et al.

(10) Patent No.: US 12,434,581 B2
(45) Date of Patent: Oct. 7, 2025

(54) SUPPORT MECHANISM FOR A CHARGING CABLE

(71) Applicant: Kempower Oyj, Lahti (FI)

(72) Inventors: Ari Nurminen, Lahti (FI); Petri Korhonen, Lahti (FI); Esa Istukaissaari, Lahti (FI)

(73) Assignee: Kempower Oy, Lahti (FI)

( * ) Notice: Subject to any disclaimer, the term of this patent is extended or adjusted under 35 U.S.C. 154(b) by 178 days.

(21) Appl. No.: 18/572,566

(22) PCT Filed: Apr. 6, 2022

(86) PCT No.: PCT/FI2022/050222
§ 371 (c)(1),
(2) Date: Dec. 20, 2023

(87) PCT Pub. No.: WO2023/275428
PCT Pub. Date: Jan. 5, 2023

(65) Prior Publication Data
US 2024/0294078 A1   Sep. 5, 2024

(30) Foreign Application Priority Data
Jul. 2, 2021   (FI) .................................. 20215777

(51) Int. Cl.
*B60L 53/18* (2019.01)
(52) U.S. Cl.
CPC ........... *B60L 53/18* (2019.02); *B60L 2200/18* (2013.01)
(58) Field of Classification Search
CPC ............................. B60L 53/18; B60L 2200/18
USPC ....................................................... 174/44
See application file for complete search history.

(56) References Cited

U.S. PATENT DOCUMENTS

| | | | |
|---|---|---|---|
| 2010/0102775 | A1 | 4/2010 | Chander |
| 2012/0032635 | A1 | 2/2012 | Prosser et al. |
| 2017/0158072 | A1 | 6/2017 | Sychov |
| 2018/0236885 | A1 | 8/2018 | Gamsjager |

(Continued)

FOREIGN PATENT DOCUMENTS

| | | |
|---|---|---|
| EP | 3160792 B1 | 4/2018 |
| KR | 102200439 B1 | 1/2021 |
| WO | 2018218306 A1 | 12/2018 |

OTHER PUBLICATIONS

Search Report from priority FI Appln. No. 20215777, Feb. 2, 2022, Finnish Patent and Registration Office, FI.

(Continued)

*Primary Examiner* — Tremesha W Burns
(74) *Attorney, Agent, or Firm* — Frost Brown Todd, LLP; Alexander J. Johnson

(57) ABSTRACT

The present invention relates to a support mechanism for a charging cable for electric vehicles. The charging cable comprises, at its distal end, a charging plug connectable to a charging inlet of an electric vehicle. The support mechanism comprises at least one joint and at least one spring element for facilitating movement of the support mechanism at least in vertical dimension between an idle position and an operation position. In the idle position, the entire support mechanism and the charging plug are placed above a space reserved for parking the electric vehicles. In the operation position, the charging plug is provided within the space reserved for the electric vehicles during charging, and the charging plug is approximately at the same horizontal level as the charging inlet of an electric vehicle.

11 Claims, 3 Drawing Sheets

(56) References Cited

U.S. PATENT DOCUMENTS

2020/0369167 A1   11/2020   Krucinski et al.
2021/0155102 A1    5/2021   Shin

OTHER PUBLICATIONS

Int'l. Search Report from PCT/FI2022/050222, Jul. 7, 2022, European Patent Office, NL.
Search Report from 20215777, Feb. 2, 2022, Finnish Patent and Registration Office, FI.

SUPPORT MECHANISM FOR A CHARGING CABLE

FIELD

The present invention relates to the field of charging electrical vehicles. More particularly, the present invention relates to an apparatus that enable controlling position of a charging cable in vertical direction. The invention enables lifting the charging cable up, away from the route of the vehicles, when the charging cable is not in use and lowering it down when in use for charging an electrical vehicle.

BACKGROUND

Electrically powered vehicles, such as electric buses and other vehicles are typically stored in sheltered parking spaces such as parking halls, or in open parking spaces. Batteries of the electric vehicles are preferably charged in the same space. Typically, vehicles are parked in columns or in other equivalent arrangement, so that they are side to side, quite close to each other. This causes challenges in placing charging equipment within the parking space whenever there are more than two columns. For example, if units of the charging apparatus need to be placed within the parking space between the vehicles, this increases space needed for parking, because the charging apparatus occupy some of the floor area and electric vehicles cannot therefore be parked as densely as traditional fuel driven vehicles. On the other hand, charging cables hanging from above in the level in which the vehicles move causes a risk of collisions between the charging cables and/or connectors and the vehicles, which may cause harm for both the charging system and the vehicles, for example external mirrors thereof.

Various solutions have been presented for resolving problems in charging devices.

DESCRIPTION OF THE RELATED ART

Various types of spin driven cable reels are known in the art, which tend to easily fail in a wet and cold environment, especially in sub-zero temperatures due to ice freeze-up. Furthermore, a cable reel is not applicable to high currents required for fast charging because the cable on the reel acts as an electrical inductor.

EP3466747 A1 discloses a charging station for electric vehicles that has a height-adjustable held charging cable connector. The charging cable can be moved horizontally, but it is still possible that a vehicle hits the charging cable unintentionally while moving within the parking space.

EP3160792 A1 discloses a ceiling mounted charging station. This enables rising the charging cable. However, the charging station has a design that is quite challenging for practical manufacturing. This enables rising the charging cable above the parking space when in use, but this invention is difficult to use if the parking space is high.

US2018/236885 A1 discloses a positioning unit for a charging station of an electrically driven vehicle. Position of a hinged arm element is adjusted by a drive element. The positioning unit exerts a defined contact force on a contact position of the vehicle.

KR102200439 B1 discloses a mechanism for electric vehicle charging device with a charging cable wound inside a charging supply unit. Upon occurrence of a failure, the power supply unit can be slowly rotated down around a hinge axis for repairing.

US2020/0369167 A1 discloses a system for charging commercial electrical vehicles. A suspension arm is attached to a cable suspension post. The cable suspension post can include one or more biasing elements to bias the suspension arm to a particular location and/or orientation.

In view of problems of the known solution, it is the object of the present invention to provide a charging station which avoids the disadvantages of the state of the art at least partially.

SUMMARY

An object is to provide a method and apparatus to solve the problem of providing a reliable charging cable holder, in other words a support mechanism for a charging cable of electric vehicles. The objects of the present invention are achieved with an apparatus according to the claim 1.

The preferred embodiments of the invention are disclosed in the dependent claims.

According to a first aspect, a support mechanism of a charging cable for electric vehicles is provided. The charging cable comprises, at its distal end, a charging plug connectable to a charging inlet of an electric vehicle. The support mechanism comprises at least one joint and at least one spring element for facilitating movement of the support mechanism at least in vertical dimension between an idle position and an operation position. In the idle position, the entire support mechanism and the charging plug are placed above a space reserved for parking the electric vehicles. In the operation position, the charging plug is provided within the space reserved for the electric vehicles during charging, and the charging plug is approximately at the same horizontal level as the charging inlet of an electric vehicle. The at least one spring element comprises at least one first spring element having a first end and a second end and configured to control position of a first beam attached to a first shaft or a mounting plate. The first end of the first spring element is pivotably attached to the first shaft or the mounting plate and the second end of the first spring element is pivotably attached to the first beam. Effective stiffness of the at least one first spring element is adjustable by changing the point of attachment of the second end of the first spring element to the first beam.

According to a second aspect, the at least one spring element is any one of a mechanical spring, a gas spring, a hydraulic actuator, a pneumatic actuator and an electric actuator or a combination thereof.

According to a third aspect, the support mechanism is attachable on a rotatable or a hinged platform, thereby enabling moving the charging cable and the charging plug in lateral dimension.

According to a fourth aspect, the movement of the support mechanism and thus the position of the charging plug is manually adjustable by a guide element, such as a rope, attached to the support mechanism.

According to a fifth aspect, the movement of the support mechanism is adjustable by use of a remote controller.

According to a sixth aspect, the remote controller is configured to control operation of the at least one spring element.

According to a seventh aspect, the support mechanism further comprises an integrated user interface and/or one or more control elements, such as switches or pushbuttons, for controlling the charging operation.

According to an eighth aspect, the at least one spring element is configured to reduce force required for bringing the support mechanism from the operating position to the idle position, and/or the at least one spring element is configured to control speed of the movement while the support mechanism is being brought from the idle position to the operation position.

According to a ninth aspect, the at least one spring element of the support mechanism is configured to reduce or remove upward pulling force and/or upward torsion subjected towards the charging plug and/or to an attached charging inlet of the electrical vehicle during charging operation, by restraining the support mechanism in the operating position.

According to a tenth aspect, the at least one spring element comprises at least one second spring element having a first end and a second end and configured to control position of a second beam attached to a second shaft, wherein the first end of the second spring element is pivotably attached to the second shaft and the second end of the second spring element is pivotably attached to the second beam. Effective stiffness of the at least one second spring element is adjustable by changing the point of attachment of the second end of the second spring element to the second beam.

According to an eleventh aspect, the support mechanism further comprises a plurality of cable guiding members extending from said first beam and, when dependent on the eleventh aspect, from said second beam, the cable holding members configured to guide the charging cable in parallel to the longitudinal dimension of the respective beam at a predefined distance from the respective beam.

According to another aspect, a system is provided that comprises a power unit, a charging control unit, a charging cable and a support mechanism according to any one of the above aspects.

The present invention is based on the idea of a support mechanism that enables storing the charging cables above the parking space, whenever there is a need to move vehicles within the parking space and/or no need to charge the vehicles. When a vehicle is to be charged, it is parked in vicinity of the support mechanism so that the charging cable can be brought down by changing position of the support mechanism and a charging plug can be coupled to the vehicle's charging inlet. Movement of the support mechanism and the charging cable from the idle position (up) to the operating position (down) is facilitated either manually or by using remote control that operates one or more motors, such as an electrical-, gas-, pressure air-motors, or by using one or more remotely controllable pneumatic, gas or electric actuators.

The present invention has the advantage that parking density of the vehicles can be maintained equal or near-equal with that of non-electric vehicles, thus avoiding need to increase amount of parking space for a fleet of vehicles when switching from fuel driven to electric vehicles, since no charging units need to be installed in fixed positions between the vehicles within the parking space. When the cable holder is in down in its operating position, there is no upward pulling force so that the charging can be performed safely—the charging cable holder does not cause upward torsion on the charging plug in the operating position. After the charging process has been completed, the charging plug is disconnected from the electric vehicle's charging inlet and the charging cable holder with the charging cable is returned in its idle position above the charging area either by gently pushing it upwards or using the motors or actuators.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
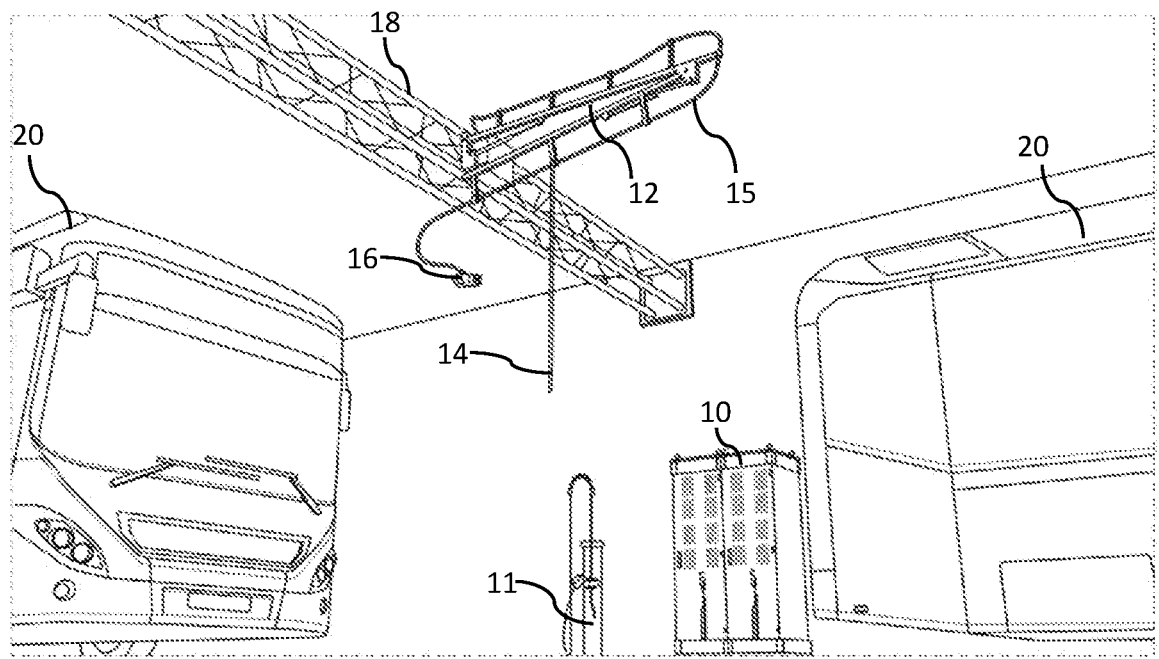
FIG. 1 illustrates a charging cable holder in its idle position above a parking space.

The FIG. 1 illustrates a charging system, comprising a power unit (10), a charging control unit (11) and a charging cable holder (12) according to the current invention. The power unit (10) provides charging power needed by the vehicles to be charged and is connected to power grid The charging control unit (11) communicates with the vehicle to be charged and the power unit (10) in order to communicate the power needs of the vehicle to be charged to the power unit (10). The power unit (10) and the charging control unit (11) are elements of a charging system, such as a Kempower™ S-series or C-series power unit and charging control unit. Any other electric vehicle charging system is also applicable.

In the FIG. 1, the charging cable holder (12) is in its idle position, in which the charging cable holder (12) holding the charging cable (15) is preferably on a horizontal level above the parking space of the vehicles (20). The mechanism of the charging cable holder (12) enables folding it into the idle position. In this context, folding refers to a knee type folding, which reduces effective length of the charging cable holder (12) when in the idle position and thus reduces torsion caused on the mounting structure in comparison to a single stiff beam. When the charging cable holder (12) is in the idle position, it is entirely above the parking space, and the charging cable holder (12) requires minimum space in vertical dimension.

A charging cable (15) is provided for delivering charging power from the power unit (10) towards the electric vehicle (20). Charging operation is preferably controlled by a charging control unit (11). Proximal end of the charging cable (15) is coupled towards the charging control unit (11) and/or the power unit (10). A charging plug (16) is attached at the distal end of the charging cable (15), and the distal end of the charging cable (15) with the charging plug (16) preferably extends from the distal end of the charging cable holder (12). The distal end of the charging cable (15) and the charging plug (16) may hang slightly below the horizontal level of the charging cable holder (12) when in idle position, but still above the space in which the electric vehicles (20) move.

Position of the charging cable holder (12) and movement between its idle and operating positions can be adjusted using mechanical springs, gas springs, electric motors, hydraulic actuators or other equivalent actuators. A guide element (14), which may comprise a rope with suitable length attached to the charging cable holder (12), may be provided that facilitates reaching the charging cable holder (12) when in idle position and moving the charging cable holder (12) between the idle position shown in the FIG. 1 and the operating position shown in the FIG. 2 Length of the guide element (14) should be such that it can easily be grabbed by a person standing on floor or ground below the charging cable holder (12) when it is in the idle position. Material of the guide element (14) is preferably soft enough so that it does not cause harm on the vehicle (20) even if it would touch the vehicle when it passes the guide element (14).

Figure 2:
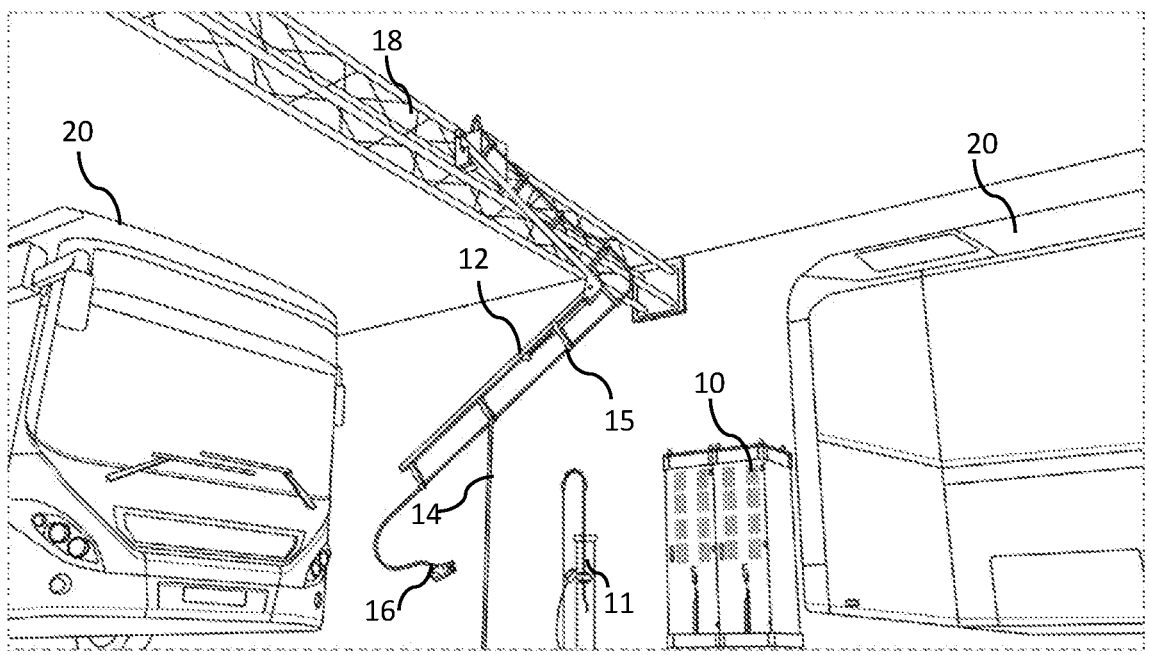
FIG. 2 illustrates a charging cable holder in its operating position within the parking space.

The FIG. 2 illustrates the charging cable holder (12) in its operating position, in which the charging cable holder (12) has been brought down to the operating level, so that the charging plug (16) in the distal end of the charging cable (15) is approximately at the level of a charging inlet (not shown) of the respective electric vehicle (20). Approximately at the level of a charging inlet refers to a position in vertical dimension in which the distal end of the charging cable (15) that extends from the charging cable holder (12), in particular the charging plug (16) at the distal end of the charging cable (15) can be coupled with a charging inlet of the electric vehicle (20) with ease. In the operating position, the charging cable holder (12) is restrained in vertical dimension so that it does not cause any upward pulling force on the charging cable (15). Thus, no upward torsion is caused on the charging plug (16) or the charging inlet of the electric vehicle (20) in the operating position. The charging cable (15) is extends from the lower, distal end of the charging cable holder (12) in the operating position so that distal end of the charging cable (15) and the charging plug (16) attached to it can be moved within a radius defined by the freely hanging portion of the charging cable (15) in the vicinity of the distal end of the charging cable holder (12) when in operating position. In these non-limiting examples of FIGS. 1 and 2, the charging cable holder (12) is attached to a beam (18) extending above the space used by the electric vehicles (20). As understood by a skilled person, various support structures are applicable on which the charging cable holder (12) can be mounted above the space in which the electric vehicles (20) are moving.

The charging cable holder (12) can be characterized as an arm that preferably comprises at least two beams coupled to each other by a joint. The joint between the beams may be characterized as a knee joint or elbow joint. Movement of the charging cable holder (12) is enabled by hinges and facilitated by at least one spring element (35). If a longer reach is required, or if there is limited space available for the charging cable holder (12) in the idle position, more than two beams may be provided, coupled to each other by joints between adjacent beams, and optionally provided with further spring elements (35). For example, one spring element may be provided for each beam, but in some embodiments, one or more beams may be implemented without corresponding spring element. At least one spring element is required to achieve the benefits of the invention. In some designs, a beam may be provided with more than one spring element facilitating its movement.

Figure 3:
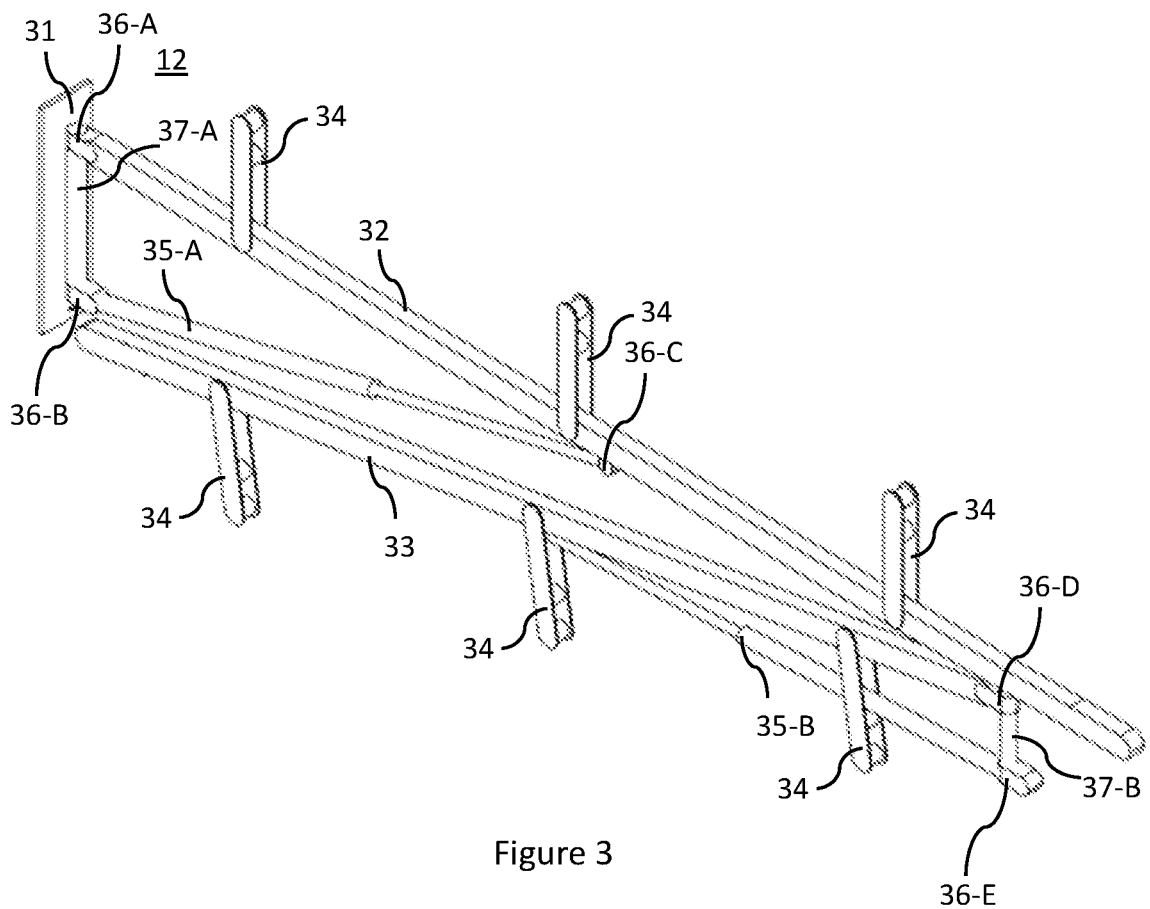
FIG. 3 illustrates a perspective view of a charging cable holder according to an embodiment.
Figure 4:
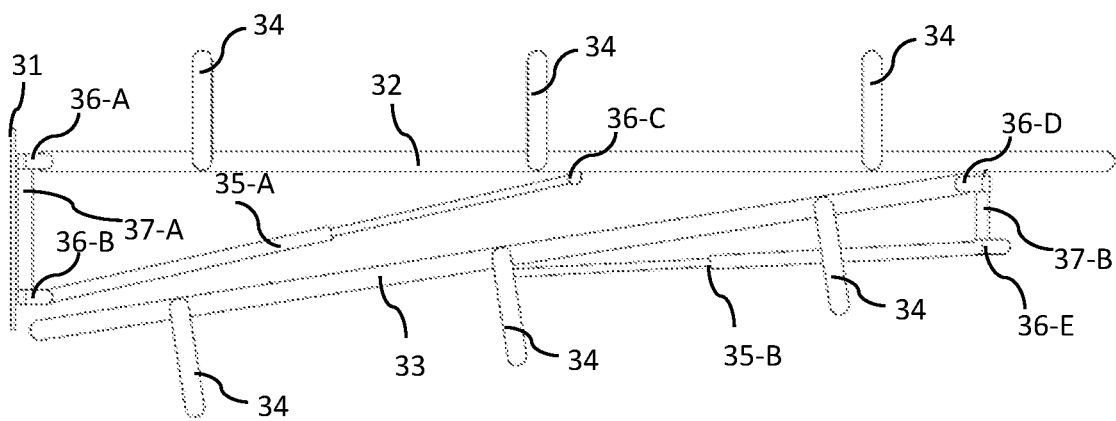
FIG. 4 illustrates a side view of a charging cable holder in its idle position.

The FIG. 3 illustrates a perspective view of a charging cable holder (12) according to a preferred embodiment of the invention, when in the idle position, and the FIG. 4 illustrates a side view of the charging cable holder (12) in the idle position. The proximal end of the charging cable holder (12) comprises a mounting plate (31) for coupling the charging cable holder (12) to a mounting platform, such as the beam (18) shown in the FIGS. 1 and 2. The arm of the charging cable holder (12) according to the embodiment comprises an upper beam (32) and a lower beam (33), the upper beam being vertically above the lower beam in both idle and operating position of the charging cable holder (12). In the idle position, the upper beam (33) is approximately in horizontal position and the charging cable older (12) is folded. A plurality of cable guiding members (34) attached to the upper and lower beams (32, 33) are configured to guide the charging cable (not shown) along the longitudinal dimension charging cable holder (12), while keeping the charging cable away from any moving parts of the charging cable holder (12) so that it does not block intended movement of the charging table holder (12) between its idle position and operating position. The cable guiding members (34) also prevent accidentally harming the charging cable by the charging cable holder (12) for example by squeezing the charging cable between some moving portions of the charging table holder (12). At least one spring element (35) is preferably coupled to each of the upper and lower beams (32, 33) for controlling movement thereof. Spring elements (35) may comprise any one of a mechanical spring, a gas spring, a hydraulic actuator, a pneumatic actuator and an electric actuator or a combination thereof. The spring element is adjustable in longitudinal dimension and can be restrained at least at its minimum and maximum length defined by the design of the charging cable holder (12) for maintaining the charging cable holder (12) in a wanted position. Gas springs are preferred, since they are common, cost effective and reliable. Gas springs are also available in various sizes and stiffnesses. Effective stiffness of a spring element (35) can be adjusted by changing its position with respect to the moveable beam. The position can be changed by adjusting the spring elements' coupling point to the movable beam and/or to the respective other structure. Stiffness of the spring elements (35) needed for ensuring proper operation of the charging cable holder (12) for example due to need to carry different types of cables by the charging cable holder (12). For example, a 200A cable is heavier than a 100A cable. Therefore, greater stiffness is required from the spring elements (35) to enable the charging cable holder (12) to operate as intended when carrying more load caused by the heavier charging cable, even though the basic mechanism is the same for all types of charging cables. Likewise, dimensions of the charging cable holder itself, such as length and thickness, as well as weight of the beams that depends on the dimensions and material of the beams, affect the required stiffness of spring elements.

Preferably, attachment point between the second end of the spring element and the respective beam is adjustable so that it can be adjusted for example when the type of charging cable is changed or when operating characteristics of the spring element have changed for any reason: for enabling adjustment of the attachment point of second end of the spring element, the joint between the spring element and the respective beam is preferably releasably fixed to the respective beam.

A plurality of hinges (36) enable positions of the upper and lower beams (32, 33) and the spring elements (35) to be adjusted pivotably with respect to the mounting plate (31) and/or each other.

A first shaft (37-A) may be arranged between the upper beam (32) and a first spring element (35-A). One or more first hinges (36-A) are provided between the mounting plate (31) or the first shaft (37-A) and a first end of the upper beam (32) and one or more second hinges (36-B) are provided between the mounting plate (10) or the first shaft (37-A) and a first end of the first spring element (35-A), thus enabling pivoting of the upper beam (32) in vertical dimension about the first end of the upper beam (32) for facilitating movement of the upper beam (32) between the idle position and the operating position. The first shaft (37-A) is preferred from mere mounting plate (31) since is increases robustness of the structure. When the first shaft (37-A) is included in the structure, the first end of the upper beam (32) is coupled to a first end of the first shaft (37-A) by the first hinge (36-A) and the first end of the first spring element (35-A) is coupled to the second, opposite end of the first shaft (37-A) by the second hinge (36-B). Preferably, the second end of the first spring element (35-A) is attached to the upper beam (32) by a third hinge (36-C) at a point between the two ends of the upper beam (32), which is preferably approximately at the middle of the upper beam (32) in its longitudinal dimension, but as indicated above, the point of attaching the second end of the first spring element to the upper beam, effected by the one or more second hinges releasably fixed to the upper beam, may be adjusted depending on effective stiffness required from the first spring element.

According to some embodiments, the mounting plate (31) of the charging cable holder (12) is mounted on a rotatable or hinged platform, thereby enabling moving the charging cable and the charging plug in lateral dimension. According to some embodiments, the mounting plate is coupled to a running rail to enable moving the charging cable holder (12) laterally. According to some embodiments, first and second hinges (36-A, 36-B) between the mounting plate (31) or the first shaft (37-A) and the upper beam (32) and between the mounting plate (10) or the first shaft (37-A) and the first spring element (35-A) also enable pivoting of the upper beam (32) and the first spring element (35-A) in lateral dimension. For example, the joints attaching the upper beam and the first spring element (35-A) to the mounting plate (31) or the first shaft (37-A) may be double-hinged.

A second shaft (37-B) is arranged between the upper beam (32) and the second spring element (35-B). The second shaft (37-B) is fixed to the upper beam (32) in a predefined angle, and a first end of the lower beam (33) is coupled to the upper beam (32) by a fourth hinge (36-D) at or near a second end of the upper beam (32) so that the first end of the lower beam (33) is further away from the second end of the upper beam (32) than the fourth hinge (36-D). With near the second end we refer to a position that is preferably at most 10% of the total length of the upper beam (32) away from the second end of the upper beam (32). The fourth hinge (36-D) pivotably couples a first end of the second shaft (37-B) to a first end of the lower beam (33). The second, opposite end of the second shaft (37-B) is pivotably coupled to a first end of the second spring element (35-B) by a fifth hinge (36-E). A second, opposite end of the second spring element (35-B) is attached by a sixth hinge (not shown) to the lower beam (33), thus enabling the position of the lower beam (33) to be adjusted by the second spring element (35-B) and the second shaft (37-B). Preferably, the second end of the second spring element (35-B) is attached to the lower beam (33) by the sixth hinge at a point between the two ends of the lower beam (33), which is preferably approximately at the middle of the lower beam (33) in its longitudinal dimension, but as indicated above, the point of attaching the second end of the second spring element to the lower beam, effected by the sixth hinge releasably fixed to the lower beam, may be adjusted depending on effective stiffness required from the second spring element.

As can be seen in the FIGS. 3 and 4, in the idle position, when the elbow type joint between the upper and lower beams (32, 33) is in its folded position, the second end of the lower beam (33) becomes in the vicinity of the mounting plate (31) and/or the second end of the first shaft (37-A).

Figure 5:
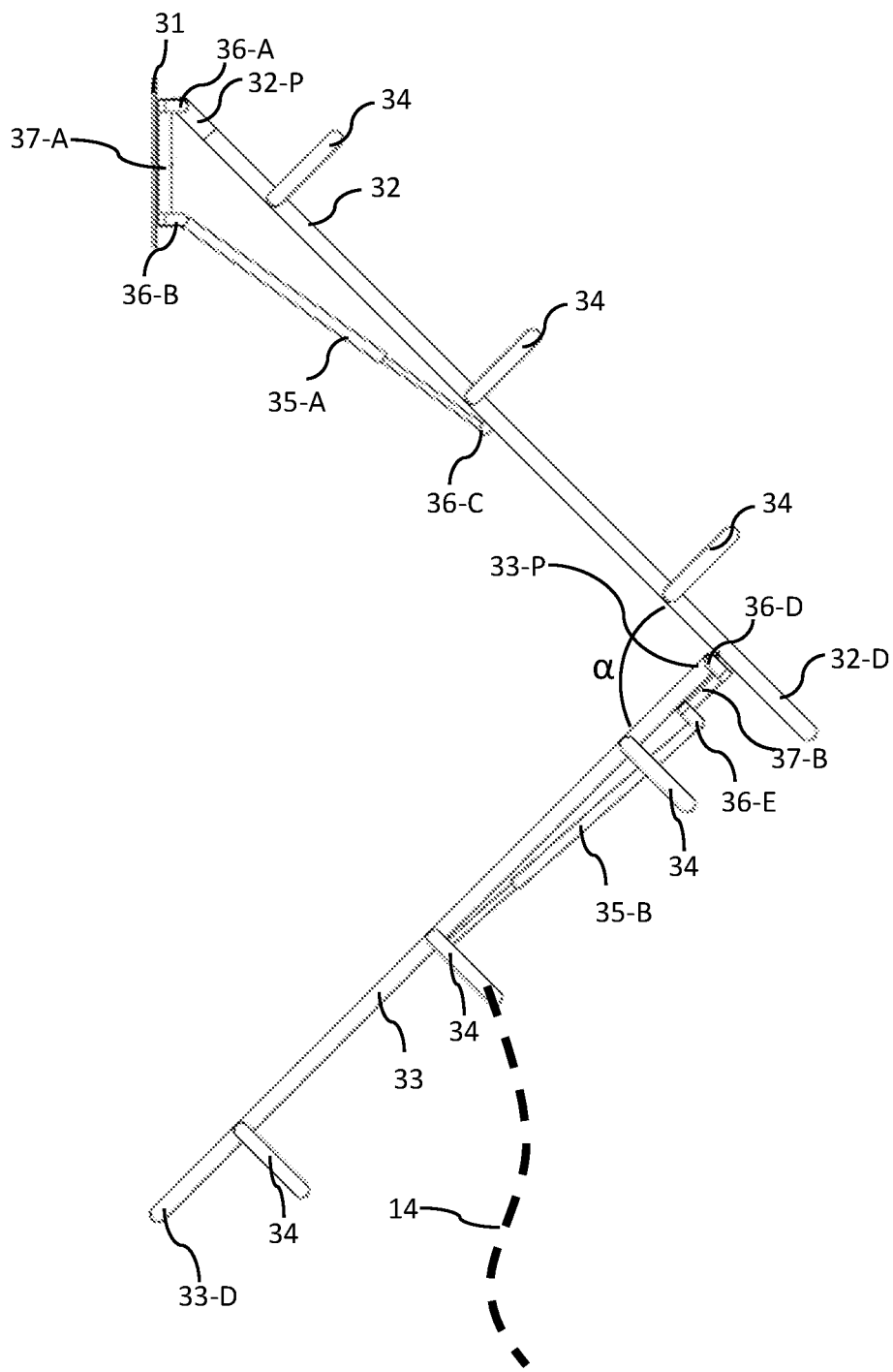
FIG. 5 illustrates a side view of a charging cable holder in its operating position.

FIG. 5 illustrates the charging cable holder (12) according to the preferred embodiment, when in operating position. Both the upper beam (32) and the lower beam (33) are pivoted from the original, idle position so that they are in a diagonal position. The second, distal end (32-D) of the upper beam (32) is below the horizontal level of the first, proximal end (32-P) thereof, and the distal, second end (33-D) of the lower beam (33) is below the first, proximal end (33-P) thereof. This way the distal end (33-D) of the lower beam (33), which forms the distal end (33-D) of the charging cable holder (12) can be brought down to a level that enables a user to plug in the attached charging cable (not shown) to the charging inlet of the electric vehicle. The proximal end (32-P) of the lower beam (32) rests against the second shaft (37-B) that supports first end of the lower beam (33) in a predefined angle α between the upper beam (32) and the lower beam (33).

FIG. 5 further illustrates the optional guide element (14) attached to the charging cable holder (12) that enables manually pulling the charging cable holder (12) from the idle position to the operating position. The guide element (14) may be attached to any suitable place at the lower beam (33) or to one of the cable guiding members (34) attached to the lower beam (33).

For moving the charging cable holder (12) from the idle position into the operating position, the user grabs the guide element (14) and pulls it downwards, which causes position of the elbow joint to change from folded to open, thus bringing the distal end (33-D) of the lower beam down to the operating position. During this movement, spring elements (35) that held the charging cable holder (12) in the idle position change their shape, in particular their length, slowing down the movement to disable a sudden slamming movement and facilitating a soft, controlled transition between the two positions. When the charging cable holder (12) reaches its operating position, the spring elements (35) enable holding this position steady so that the charging cable holder (12) has no tendency to autonomously move back to idle position. When the charging cable holder (12) is to be moved back to the idle position, the user gently pushes the lower beam (33) upwards to initiate the upward movement. The push by the user activates the spring elements (35), which softly pull the charging cable holder (12) in a controlled manner up into the idle position, thus reducing force required to perform this movement.

Alternatively, or in addition, the charging cable holder (12) may be provided with remotely activated motors or actuators, which enable remotely controlling the position of the charging cable holder (12) and its movements between idle and operating positions.

According to some embodiments, an integrated user interface and/or one or more control elements, such as switches or pushbuttons, for controlling the charging operation are attached to the charging cable holder (12), preferably at or near the distal end (33-D) of the charging cable holder (12), i.e. the distal end of the lower beam (33) so that the user interface and/or control elements can be easily reached by a person standing on the level of the vehicle when the charging cable holder (12) is in its operating position.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A support mechanism of a charging cable for electric vehicles, the charging cable comprising at its distal end a charging plug connectable to a charging inlet of an electric vehicle, the support mechanism comprising a first shaft or a mounting plate, a second shaft, a first beam, a second beam, at least two joints, and at least one spring element for facilitating movement of the support mechanism at least in a vertical dimension between an idle position and an operating position, wherein, in the idle position, the entire support mechanism and the charging plug are placed above a space reserved for parking the electric vehicle, and wherein, in the operating position, the charging plug is provided within the space reserved for parking the electric vehicle during a charging operation, and wherein the charging plug is approximately at a same horizontal level as the charging inlet of the electric vehicle, wherein a first spring element is configured to control a position of the first beam attached to the first shaft or the mounting plate by a first joint, wherein the first shaft or the mounting plate is arranged in a vertical position, wherein a first end of the first spring element is pivotably attached to the first shaft or the mounting plate at a position that is vertically below the position at which the first beam is pivotably attached to the first shaft or the mounting plate, wherein a second end of the first spring element is pivotably attached to the first beam, and wherein an effective stiffness of the at least one first spring element is adjustable by changing a point of attachment of the second end of the first spring element to the first beam, characterized in that the second shaft is fixed to the first beam in a predefined angle, and in that the support mechanism comprises at least one second spring element configured to control position of the second beam attached to the second shaft by a second joint, wherein a first end of the second spring element is pivotably attached to the second shaft and a second end of the second spring element is pivotably attached to the second beam, and wherein an effective stiffness of the at least one second spring element is adjustable by changing a point of attachment of the second end of the second spring element to the second beam.

2. The support mechanism according to claim 1, wherein the at least one spring element is any one of a mechanical spring, a gas spring, a hydraulic actuator, a pneumatic actuator, an electric actuator, or a combination thereof.

3. The support mechanism according to claim 1, wherein the support mechanism is attachable on a rotatable or a hinged platform, thereby enabling moving the charging cable and the charging plug in lateral dimension.

4. The support mechanism according to claim 1, wherein the movement of the support mechanism and thus the position of the charging plug is manually adjustable by a guide element attached to the support mechanism, wherein the guide element is a rope.

5. The support mechanism according to claim 1, wherein the movement of the support mechanism is adjustable by use of a remote controller.

6. The support mechanism according to claim 5, wherein the remote controller is configured to control operation of the at least one spring element.

7. The support mechanism according to claim 1, wherein the support mechanism further comprises an integrated user interface and/or one or more control elements for controlling the charging operation, wherein the control elements comprise switches or pushbuttons.

8. The support mechanism according to claim 1, wherein the at least one spring element is configured to reduce force required for bringing the support mechanism from the operating position to the idle position, and/or wherein the at least one spring element is configured to control speed of the movement of the support mechanism while the support mechanism is being brought from the idle position to the operation position.

9. The support mechanism according to claim 1, wherein the at least one spring element of the support mechanism is configured to reduce or remove an upward pulling force and/or an upward torsion subjected towards the charging plug and/or to an attached charging inlet of the electrical vehicle during charging operation, by restraining the support mechanism in the operating position.

10. The support mechanism according to claim 1, wherein the support mechanism further comprises a plurality of cable guiding members extending from said first beam and from said second beam, the cable guiding members configured to guide the charging cable in parallel to a longitudinal dimension of the respective beam at a predefined distance from the respective beam.

11. A system comprising a power unit, a charging control unit, a charging cable, and a support mechanism according to claim 1.

* * * * *